Figure 1:
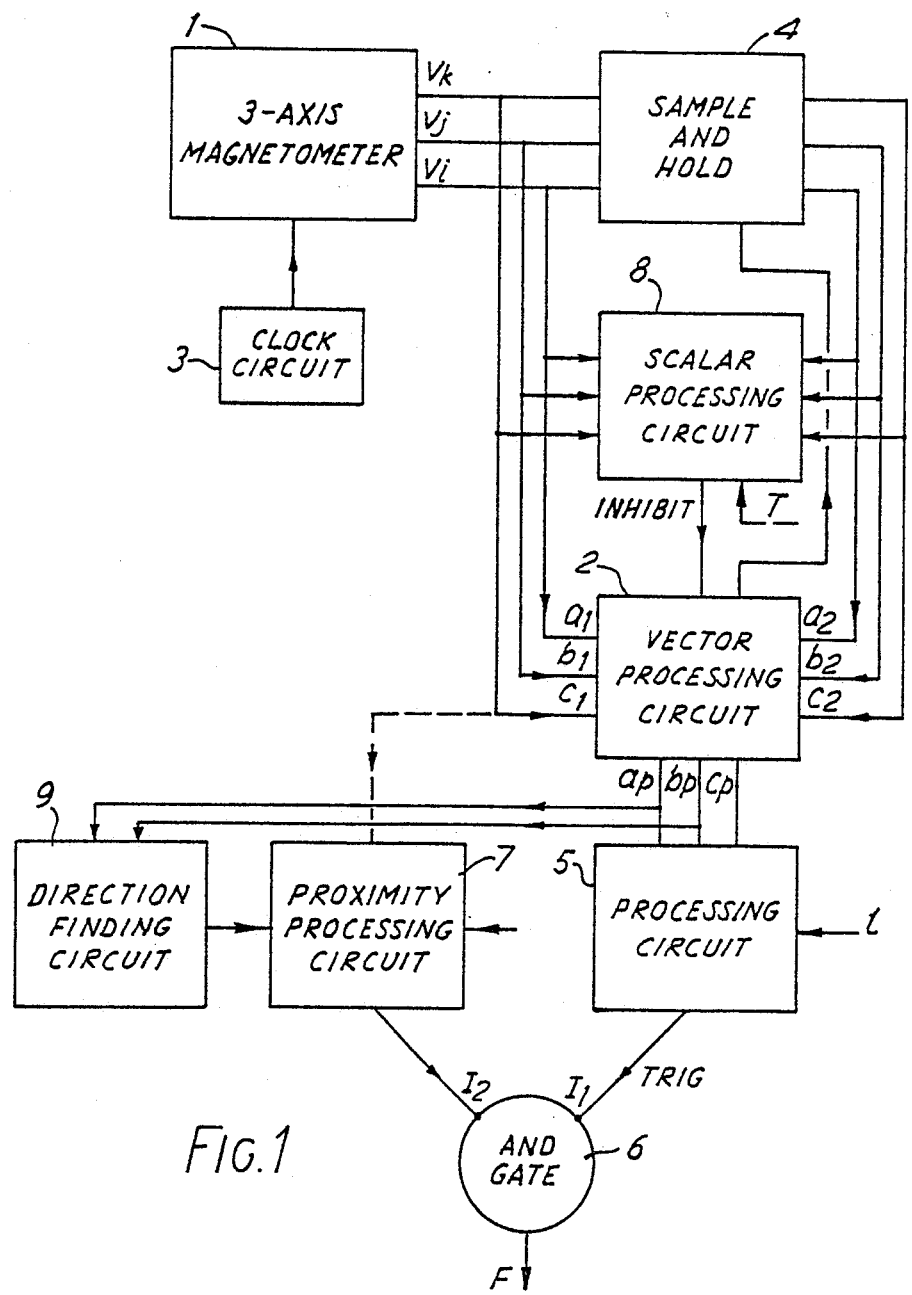

United States Patent [19]

Clutterbuck

[11] Patent Number: 4,811,665
[45] Date of Patent: Mar. 14, 1989

[54] MAGNETIC SENSOR ARRANGEMENT

[75] Inventor: Richard C. D. Clutterbuck, Cobham, England

[73] Assignee: Thorn Emi Electronics Limited, Hayes, England

[21] Appl. No.: 35,041

[22] Filed: Mar. 18, 1987

[30] Foreign Application Priority Data

Mar. 19, 1986 [GB] United Kingdom ............... 8606794

[51] Int. Cl.$^4$ .............................................. F42C 13/08
[52] U.S. Cl. .................................................. 102/427
[58] Field of Search ............................. 102/427, 417

[56] References Cited

U.S. PATENT DOCUMENTS

| 2,485,931 | 10/1949 | Slonczewski | 102/417 |
| 3,308,760 | 3/1967 | Peters | 102/427 |
| 3,699,889 | 10/1972 | Cioccio et al. | 102/417 |

FOREIGN PATENT DOCUMENTS

| 3200918 | 7/1983 | Fed. Rep. of Germany | 102/427 |
| 3339066 | 5/1985 | Fed. Rep. of Germany | 102/427 |
| 1050490 | 12/1966 | United Kingdom . |
| 1202534 | 8/1970 | United Kingdom . |
| 1384659 | 2/1975 | United Kingdom . |
| 2159278 | 11/1985 | United Kingdom . |

OTHER PUBLICATIONS

*Avionics Navigation Systems,* Edited by M. Kayton and W. H. Fried, pp. 21–23, published 1969, Wiley & Sons.

*Primary Examiner*—Charles T. Jordan
*Attorney, Agent, or Firm*—Fleit, Jacobson, Cohn & Price

[57] ABSTRACT

A magnetic sensor arrangement for monitoring movement of a vehicle on a path includes a three-axis accelerometer (1) and a processing circuit (2) for evaluating the vector product Hp of magnetic field vectors measured by the accelerometer when the vehicle is at two successive positions on the path. The vector product is utilized to evaluate a parameter related to vehicle trajectory. The arrangement may be used to generate a firing signal in an explosive mine or for monitoring a flow of vehicles along the path.

9 Claims, 3 Drawing Sheets

MAGNETIC SENSOR ARRANGEMENT

This invention relates to a magnetic sensor arrangement for monitoring movement of a vehicle along a path, and it relates particularly, though not exclusively, to a magnetic sensor arrangement for use in an explosive mine.

Conventionally, a magnetic sensor in an explosive mine detects a change in the vertical component of magnetic field strength due to movement of a vehicle e.g. a tank. Typically, a detected field change increases to a maximum value as the vehicle approaches the mine and descreases as the vehicle moves away. If the vehicle passes close to the mine, the sensor arrangement may detect several maxima, and techniques have been devices to evaluate whether a detonation signal should be transmitted. It has been found that the technique adopted hitherto sometimes leads to nugatory detonations which arise when a vehicle is sufficiently close to the mine to trigger a detonation but is too remote to suffer serious change. This problem arises particularly if the mine is fitted with a highly directional shaped charge.

It is a object of the present invention to provide a magnetic sensor arrangement which at least alleviates this problem.

In accordance with one aspect of the present invention there is provided a magnetic sensor arrangement for monitoring movement of a vehicle on a path, the arrangement comprising means sensitive to magnetic field strength in three mutually orthogonal directions to generate respective electrical signals representing a magnetic field vector related to the current position of the vehicle, and means to combine respective said electrical signals corresponding to two successive positions of the vehicle to evaluate a parameter related to the trajector of the vehicle.

Preferably said parameter is related to the vector product of magnetic field vectors represented by the respective said electrical signals, the vector product being of the form $\underline{H}_p = a_p\hat{i} + b_p\hat{j} + c_p\hat{k}$, where $\hat{i}$, $\hat{j}$, $\hat{k}$ are unit vectors in said three mutually orthogonal directions and $a_p$, $b_p$ and $c_p$ are the magnitudes of the components of the vector product in said directions. Said parameter may then be of the form $$\tan\theta = \frac{c_p}{(a_p^2 + b_p^2)^{\frac{1}{2}}},$$

where $\theta$ is the angle subtended by vector $\underline{H}_p$ and the unit vertical vector $\hat{k}$, and indicates the proximity of the current trajector of the vehicle to the sensor arrangement.

In addition, means may be provided to evaluate a scalar product of the magnetic vectors represented by the respective said electrical signals. The scalar product can be used to indicate a threshold a minimum magnetic vector rotation, and thereby gives the system a degree of immunity to noise in the magnetic field measuring circuits.

The magnetic sensor arrangement may include means to generate a trigger signal in dependence on the value of said parameters. The trigger signal may be generated, for example, if the value of said parameter is no greater than a preset threshold value, this threshold value being commensurate with trajectories which are deemed to be sufficiently close to the magnetometer as to be acceptable.

In accordance with another aspect of the present invention an explosive mine includes a magnetic sensor arrangement in accordance with said one aspect of the invention.

Detonation of the mine may be prevented unless said trigger signal has been generated, and since the trigger signal is only produced if the vehicle is expected to pass the mine at a satisfactory distance (i.e. provided its trajectory is deemed acceptable) occurrence of nugatory detonations should be reduced greatly.

Figure 2:
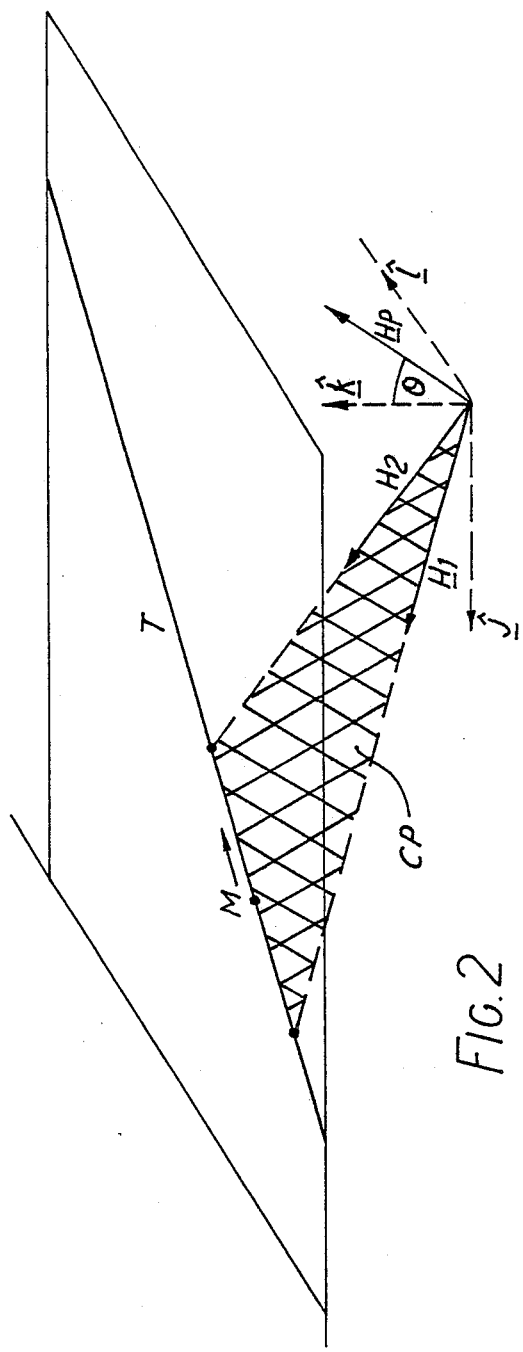
Figure 3:
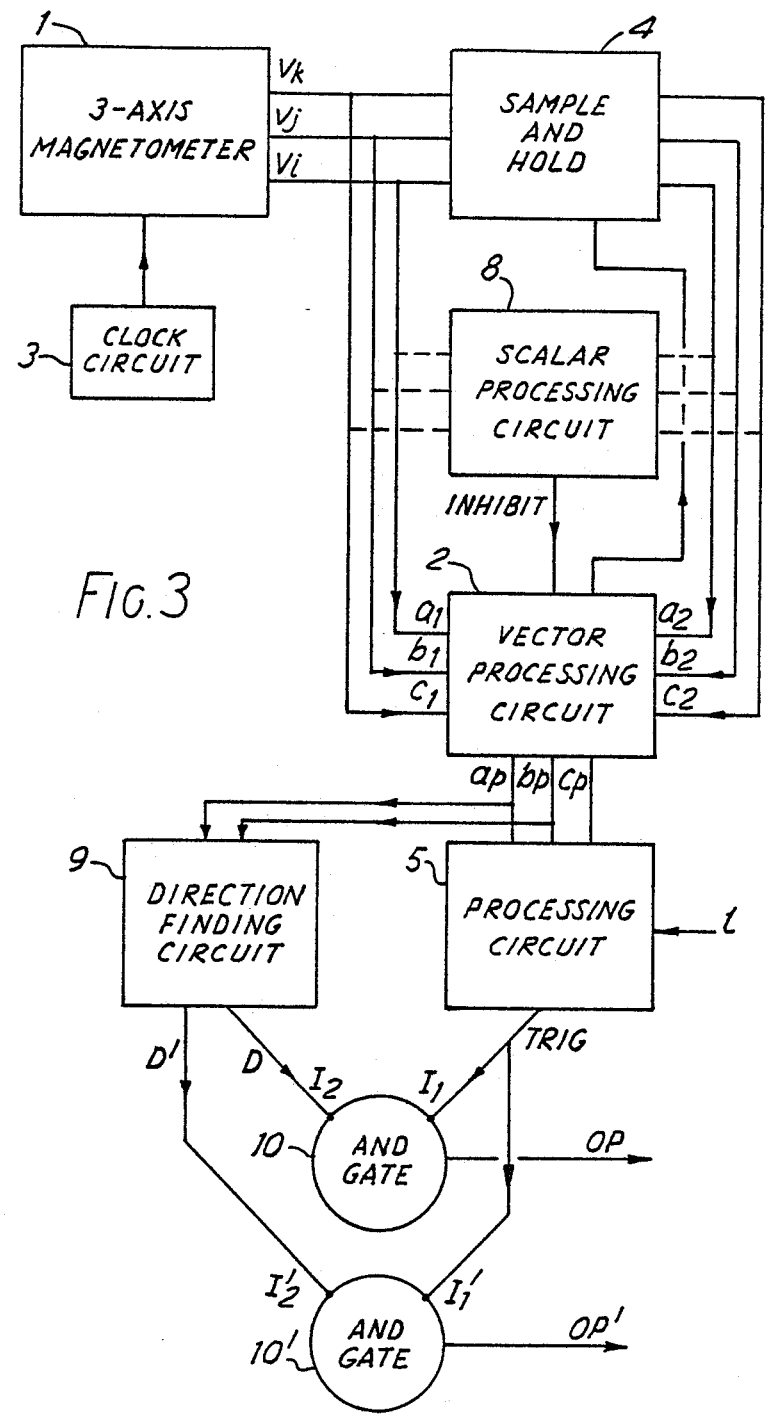

In order that the invention may be carried into effect different embodiments thereof are now described, by way of example only, by reference to the accompanying drawings of which:

FIG. 1 shows, in block schematic form, a magnetic sensor arrangement constituting a part of the detection system of an explosive mine, FIG. 2 illustrates diagramatically operation of the arrangement of FIG. 1 and, FIG. 3 shows, in block schematic form, a magnetic sensor arrangement constituting part of a vehicle monitoring system.

It will be assumed, by way of illustration, that a magnetic sensor arrangement, shown in FIG. 1 of the drawings, monitors movement of a vehicle (e.g. a tank) along a path. The vehicle, being made of a magnetisable metal, is made slightly magnetic by the earth's magnetic field and so gives rise to a small, but detectable magnetic field.

The magnetic sensor arrangement includes a three-axis magnetometer 1 arranged to measure magnetic field strength in three mutually orthogonal directions, corresponding to the $\hat{i}$, $\hat{j}$, and $\hat{k}$ unit vectors. The magnetometer generates respective output voltages $V_i$, $V_j$, $V_k$ representing field strength in the three directions, and in this example additional circuitry (not shown) is used to apply suitable off set voltages which substantially cancel out contributions from background fields which are of little inherent interest. Thus, output voltages produced by the magnetometer simultaneously represents a magnetic field vector related to the current position of the vehicle.

Output voltages generated by the magnetometer are passed periodically to a processing circuit 2 underthe control of clock circuit 3, voltages being routed to circuit 2 both directly and via a sample and hold circuit 4. Circuit 2, therefore, receives, simultaneously output voltages representing respective magnetic field vectors of the form $$H_1 = a_1\hat{i} + b_1\hat{j} + c_1\hat{k} \text{ and } H_2 = a_2\hat{i} + b_2\hat{j} + c_2\hat{k}$$

which are related to successive positions of the vehicle on the path. The coefficients $a_1$, $a_2$; $b_1$, $b_2$; $c_1$, $c_2$ respectively represent the components of magnetic field strength in the three orthogonal directions $\hat{i}$, $\hat{j}$ and $\hat{k}$.

Another processing circuit 8 operates on the voltages generated by the magnetometer to evaluate the scalar product S of vectors $H_1$ and $H_2$, S being of the form $S = a_1a_2 + b_1b_2 + c_1c_2$. Provided the scalar product S exceeds a limit $S_t$, set by circuit 8, an INHIBIT will be removed.

Processing circuit 2 will then combine the received voltages to generate three combination signals representing the coefficients $a_p$, $b_p$ and $c_p$ of a vector product $\underline{H}_p$ of the form $$H_p = H_1 \times H_2 = a_p \hat{i} + b_p \hat{j} + c_p \hat{k},$$

where $a_p = b_2 c_1 - b_1 c_2$,
$b_p = c_2 a_1 - c_1 a_2$,
and
$c_p = a_2 b_1 - a_1 b_2$,
and triggers the sample and hold circuit causing it to store the current values of magnetic field strength.

The combination signals are then passed to a further processing circuit 5 which evaluates a parameter $P_1$ of the form $$P_1 = \tan \theta = \frac{c_p}{(a_p^2 + b_p^2)^{\frac{1}{2}}}.$$

As illustrated diagramatically in FIG. 2 of the drawings, the vector product $\underline{H}_p$ is orthogonal to a common plane (shown, in part, as shaded are CP) containing the magnetic field vectors $\underline{H}$ and $\underline{H}_2$ and the trajector T along which the magnetic centre M of the vehicle is moving, and $\theta$ is the angle subtended by vector product $\underline{H}_p$ and the unit vector $\hat{k}$. Parameter $P_1$ gives an indication of the proximity of trajector T to the magnetometer, and provided this parameter is not greater than a preset threshold value 1, the trajector of the vehicle is deemed to be sufficiently close to the magnetometer to warrant further action, and circuit 5 generates a trigger signal TRIG.

In one application of the invention the magnetic sensor arrangement constitutes part of the detection system of an explosive mine. In this case the output of circuit 5 is connected to one input terminal $I_1$ of an AND gate 6, another input terminal $I_2$ of the gate being connected to a proximity processing circuit 7 effective to process detection signals from one or more conventional sensors. Sensors useful in this connection include a disturbance sensor, an acoustic sensor and a magnetic sensor, and in the case of a magnetic sensor one output of magnetometer, preferably output $V_k$, could be used.

Optionally vehicle direction may be determined by evaluating, in a direction finding circuit 9, a further parameter $P_2$ of the form, for example, $P_2 = \tan \phi = b_p/a_p$, where $\phi$ is the angle subtended by vector product $\underline{H}_p$ and unit vector $\hat{i}$. This parameter may be utilized, after suitable thresholding, as a further input to gate 6, or alternatively, as shown, as a further input to proximity processing circuit 7, and may, if required, be referenced to the geomagnetic north by reference to initial magnetic vectors derived from measurements taken prior to application of said offset voltages.

Provided all input signals are simultaneously high, gate 6 generates a firing signal F effective to initiate detonation of the mine. It will be understood that a firing signal cannot be produced until processing circuit 5 has generated a trigger signal and since this can only happen if the vehicle trajectory is deemed to be acceptably close to the mine occurrence of nugatory detonations should be reduced considerably.

In another application of the present invention, shown in FIG. 3, the magnetic sensor arrangement is used to monitor traffic flow along a road. Many of the components are the same as those used in the arrangement of FIG. 1 and are ascribed like reference numerals.

In use, the magnetic sensor arrangement, or at least magnetometer 1, is positioned at the road side. Processing circuit 5 generates a trigger signal TRIG provided the trajector of a detected vehicle is deemed to be sufficiently close to the magnetometer as to indicate a vehicle moving along the road and a trigger signal, so generated, is routed to respective first input locations $I_1$, $I_1'$ of two AND gates 10, 10'. Direction finding circuit 9 operates on components $a_p \hat{i}$ and $b_p \hat{j}$ of the vector product $\underline{H}_p$ and generates respective output signals D, D' indicative of movement of a vehicle in opposite directions, and these output signals are routed to respective second input locations $I_2$, $I_2'$ of the AND gates.

Each gate generates an output signal OP, OP' whenever the respective input signals ($I_1$, $I_2$, $I_1'$, $I_2'$) are simultaneously high, each output signal representing movement of a detected vehicle in a respective direction along the road. The output signals may be passed to respective counters (not shown), enabling traffic in each direction to be monitored and, if desired controlled.

I claim:

1. A magnetic sensor arrangement for monitoring movement of a vehicle on a path, the arrangement comprising means sensitive to magnetic field strength in three mutually orthogonal directions to generate respective electrical signals representing a magnetic field vector related to the current position of the vehicle, and means to combine respective said electrical signals corresponding to two successive positions of the vehicle to evaluate a parameter related to the trajectory of the vehicle.

2. A magnetic sensor arrangement according to claim 1 wherein said parameter is related to the vector product of magnetic field vectors represented by said respective electrical signals.

3. A magnetic sensor arrangement according claim 2 wherein said parameter is of the form $$\tan \theta = \frac{c_p}{(a_p^2 + b_p^2)^{\frac{1}{2}}}.$$

where $a_p$, $b_p$ and $c_p$ are the magnitudes of the respective components of the vector product in the directions of unit vectors $\hat{i}$, $\hat{j}$ and $\hat{k}$ and $\theta$ is the angle subtended by said vector product and the vertical unit vector $\hat{k}$.

4. A magnetic sensor arrangement according to claim 1 including means to evaluate a scalar product of said magnetic field vectors represented by said respective electrical signals.

5. A magnetic sensor arrangement according to claim 4 wherein said evaluation means is effective to inhibit said combination means in dependence on the scalar product evaluated.

6. A magnetic sensor arrangement according to claim 1 and including processing means for generating an output signal, in dependence on the value of said parameter.

7. A magnetic sensor arrangement according to claim 6 wherein said processing means is arranged to generate said output signal in dependence both on the value of said parameter and on an output of a further vehicle sensing means.

8. A magnetic sensor arrangement according to claim 7 wherein said further vehicle sensing means is sensitive of vehicle direction.

9. An explosion mine including a magnetic sensor arrangement according to claim 6 wherein said output signal is utilized as a firing signal for an explosive charge of the mine.

* * * * *